Feb. 3, 1970 H. B. ROSENBERG 3,493,840
REGULATED VOLTAGE-MULIPLIER SYSTEM
Filed Sept. 11, 1968
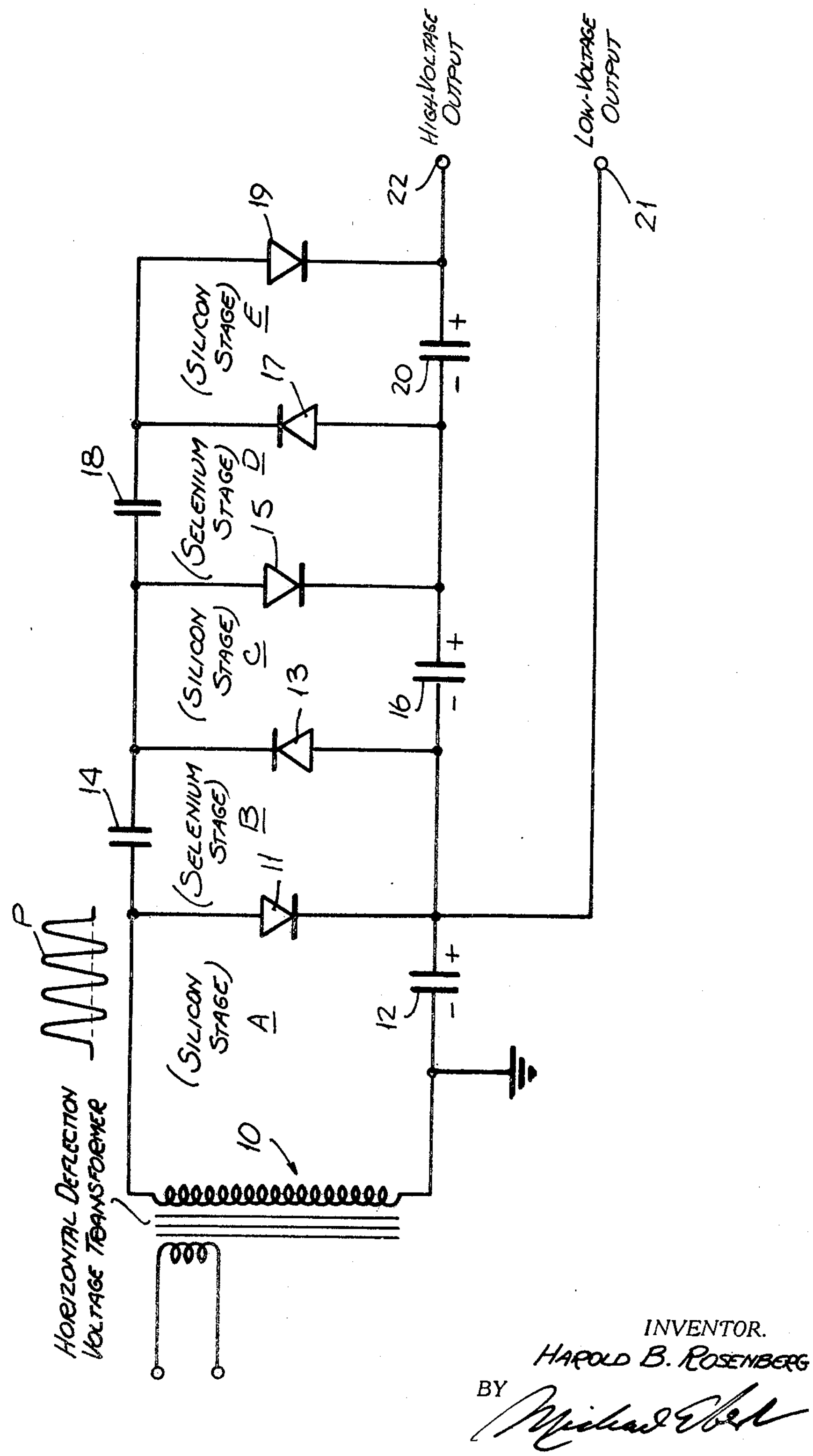
INVENTOR.
HAROLD B. ROSENBERG
BY [signature]
ATTORNEY

United States Patent Office 3,493,840
Patented Feb. 3, 1970

3,493,840

REGULATED VOLTAGE-MULTIPLIER SYSTEM

Harold B. Rosenberg, New City, N.Y., assignor to Electronic Devices, Inc., Yonkers, N.Y., a corporation of Delaware Filed Sept. 11, 1968, Ser. No. 759,125
Int. Cl. H02m 7/22
U.S. Cl. 321—15 8 Claims

ABSTRACT OF THE DISCLOSURE

A voltage-multiplier system for converting a pulsatory low-voltage into a relatively high direct-voltage, the system being formed by a ladder voltage multiplier having intercoupled stages in cascade relation, the first stage being connected to the pulsatory source. Each stage is constituted by a capacitor in series with a solid-state diode. The diodes in alternate stages are reversed with respect to the diodes in the other stages, the alternate set of diodes serving as blocking diodes, the other set being rendered conductive during the pulse cycles and serving as rectifying diodes, whereby the associated capacitors are charged to produce a direct output voltage whose value is determined by the peak voltage of the low-voltage pulses multiplied by a number equal to the number of rectifying diodes. The blocking diodes are formed by low-cost selenium cells, while the conducting diodes are formed of more expensive silicon cells characterized by lower forward resistance and superior regulation properties.

This invention relates generally to rectifying systems for producing high direct-voltages, and more particularly to a voltage-multiplier system for converting a pulsatory low-voltage into a relatively high direct-voltage.

In modern television receivers, a high direct-voltage is usually derived from the horizontal deflection circuit. A winding extension on the horizontal output transformer is connected to a half-wave rectifier of the vacuum-tube type, which supplies the high voltage for the cathode ray tube. Since the high voltage requirements for a television receiver lie in the range of 20,000 to 25,000 volts, the transformer required to supply a voltage at this level, is relatively massive and expensive.

With the growing trend toward more compact TV receivers, and the use of solid-state rather than vacuum tube circuits, existing high-voltage supplies are not compatible with this purpose. Moreover, because the rectifier tube in a TV receiver operates at an exceptionally high voltage, the accelerated electron stream therein which strikes the anode of the tube, tends to generate X-rays that constitute a serious hazard to personnel in the vicinity of the receiver.

In recent studies dealing with the danger of X-rays in TV receivers, the high voltage tube has been pointed to as a major source of such radiation. While such radiation can be reduced to safer levels by the use of shielding, this adds to the cost of the receiver and makes a more compact design even more difficult to attain.

In view of the foregoing, it is the main object of this invention to provide an efficient and reliable solid-state, high-voltage supply which is suitable for TV receivers as well as for other high-voltage applications.

More specifically, it is an object of this invention to provide a TV high-voltage supply making use of a solid-state voltage multiplier formed by alternate blocking latively low-voltage horizontal deflection voltage output transformer.

A significant feature of the invention is that it makes it possible to employ an inexpensive and less bulky transformer in the TV receiver. Another important advantage of the invention is that the solid-state rectifier produces no X-ray radiation and creates no operating hazard in this respect.

Also an object of the invention is to provide a solid-state voltage multiplier formed by alternate blocking and conducting stages in which the blocking stages employ selenium cells and the conducting stages employ silicon cells. The silicon cells, while more expensive than the selenium cells, are characterized by superior voltage-regulation characteristics, and because only these cells carry out the rectifying functions of the system, the power supply is well regulated. The poorer voltage regulation characteristics of the selenium cells do not come into play, for these units serve only a blocking function. Hence the power supply possesses the advantages to be gained by the use of silicon diodes, with a reduction in over-all cost, by reason of the use of selenium diodes in those stages of the multiplier where regulation is not a factor.

Briefly stated, these objects are attained in a voltage-multiplier system for converting a pulsatory low voltage, such as is obtained from the horizontal output transformer of a TV receiver, into a relatively high direct-voltage. The system is comprised of a ladder voltage-multiplier having intercoupled stages in cascade relation, the first stage being connected to the pulsatory source.

Each stage is constituted by a charging capacitor in series with a solid-state diode, the diodes in alternate stages being reversed with respect to the diodes in the other stages. The alternate set of diodes in the multiplier serves as blocking diodes, while the other set of diodes is conductive during the pulse cycles, and serves, therefore, as rectifying devices to charge the capacitors associated therewith.

The resultant direct high-voltage has a value determined by the voltage of the low-voltage pulses multiplied by a number equal to the number of rectifying diodes. The blocking diodes are constituted by the low-cost selenium cells, while the rectifying diodes are constituted by the higher-cost silicon cells having superior voltage-regulating characteristics.

For a better understanding of the invention as well as other objects and further features thereof, reference is made to the following detailed description to be read in conjunction with the accompanying drawing, wherein the sole figure is a schematic circuit diagram of a voltage multiplier system in accordance with the invention.

Referring now to the drawing, there is shown a system for converting a low-voltage, pulsatory source into a relatively high direct voltage. The pulsatory source may be the horizontal output transformer 10 of a TV receiver, which ordinarily is required to provide fly-back pulses which when half-wave rectified, produce a direct-voltage in the 20,000 to 25,000 volt range.

In lieu of a transformer suitably dimensioned for such purposes, the transformer 10 may be proportioned to provide only an 8000 volt output, the transformer in this instance operating with a tripler rectification circuit providing an output of 24,000 volts.

A single-phase voltage multiplier rectification circuit of conventionel design is capable of supplying rectified or D-C potentials exceeding the peak value of an applied alternating voltage, and of achieving this greater voltage without the need for bulky, expensive power transformers. Using the principles of the voltage multiplier rectification circuit, there is no theoretical limit to the maximum voltage which can be obtained. However, most practical applications limit the use of these circuits to arrangements providing three to four times the peak value.

In the arrangement shown in the diagram, the schematic arrangement is that of a five-stage ladder voltage multiplier circuit using solid-state diodes which, with an applied alternating voltage, will multiply the input to five times the peak value thereof. However, this circuit is used in conjunction with a pulsatory rather than an alternating voltage source, and functions in this context to multiply the peak value of the input by a factor of 3.

The first stage A of the multiplier is provided with a diode 11 in series with a capacitor 12; the second stage B is provided with a diode 13 in series with a capacitor 14; while the third stage C is provided with a diode 15 in series with a capacitor 16. The fourth stage D has a diode 17 in series with a capacitor 18, and the fifth and final stage E has a diode 19 in series with a capacitor 20.

The polarity of the diodes 13 and 17 in the alternate stages B and D is reversed with respect to the polarity of diodes 11, 15 and 19 in the other stages A, C and E.

Let us first analyze the operation of the five-stage ladder voltage-multiplier as it would ordinarily behave to provide a D-C output which is equal to $5\times1.414$ times the R.M.S. value of an alternating-current input. In such an arrangement, the capacitors 12, 14, 16, 18 and 20 may progressively decrease in capacitance with the distance from the A-C source which is coupled to input stage A. The current ratings of the diodes may also be decreased in the same fashion.

In A-C operation, if we can assume that each capacitor is very large in comparison with the capacitor in the succeeding stage, then the first half-cycle (+) of alternating voltage charges capacitor 12 through diode 11 to 1.414E. In the second half-cycle (−), capacitor 14 is charged through diode 13 to $2\times1.414E$; in the third half-cycle (+), capacitor 16 is charged through diode 15 to $3\times1.414E$; in the fourth half-cycle (−) capacitor 18 is charged through diode 17 to $4\times1.414E$; and in the fifth half-cycle (+) capacitor 20 is charged through diode 19 to $5\times1.414E$.

In the succeeding cycles of alternation, the voltages across the capacitors are maintained so that the voltage seen across the load is five times the peak value of the input A-C. Thus in A-C operation the output voltage is equal to the peak value of input voltage multiplied by the number of stages in the ladder circuit.

But in the present invention, we are dealing not with an alternating voltage input, but with a pulsatory voltage, as shown by waveform P, wherein the energy in each pulse cycle is primarily in one sense, such that only diodes 11, 15 and 19 in stages A, C and E which are rendered conductive during the pulse intervals, perform a rectifying function to charge capacitors 12, 16 and 20, respectively. Diodes 13 and 17 in stages B and D act only as blocking diodes to prevent discharge of capacitors 12, 16 and 20 between the charging pulse intervals.

Thus the D-C voltage established at the output terminal 21 which is connected to the first-stage capacitor 12, is equal to the peak of the pulsatory input, and that established at the output terminal 22 with respect to which the three capacitors 12, 16 and 20 are connected in series, is equal to three times the peak. The low voltage at terminal 21 may be used for the focusing circuit in a TV receiver. It will be evident, therefore, that the five-stage multiplier behaves as a tripler, not as a quintupler.

A significant aspect of the invention resides in the fact that blocking diodes 13 and 17 are formed of selenium cells whereas rectifying diodes 11, 15 and 19 are formed of silicon cells.

Selenium diodes are made by placing a thin layer of selenium on a backing plate which serves as one electrode. The outer surface of the selenium layer is then treated to form a barrier layer which enhances its blocking characteristics, a pressure or sprayed metal electrode placed thereover providing the second contact. Selenium diodes have relatively high reverse leakage. Their forward conductance and rectification efficiency are much lower than silicon devices. The selenium rectifier, however, is noted for its ability to withstand large momentary circuit overloads and surges of excessive back voltage.

Silicon junction diodes are available in alloy, grown or diffused types of structures. They are of particular interest because of their very low reverse leakage and saturation currents, and their ability to withstand higher temperatures than germanium or selenium.

Selenium and silicon diode cells are essentially resistive devices. However, the forward and reverse resistance of these cells is not linear, but varies with the magnitude of the applied potential. Hence these cells have the property of voltage regulation which is defined as the ratio of the difference between the output voltage at no load, and full load, to the full-load output voltage expressed in percent.

The difference between the no-load and full-load voltage is the potential drop across the diode in the forward direction occasioned by the forward resistance of the cells. Thus the voltage regulation of a selenium cell is a function of its non-linear forward resistance, whereby the cell's forward resistance decreases as the forward current through it increases. This property tends to counterbalance the increase in voltage drop across the cell as the load through the cell increases, resulting in a forward voltage drop which remains almost constant and low over a wide range of load current values.

Selenium cells also have the property of non-linear forward resistance, but their regulating characteristics are inferior to those of a silicon cell which has a lower forward resistance. Hence in the context of rectifying applications, the silicon cells are far more desirable than selenium cells. On the other hand, silicon cells are such more expensive, and in the five-stage multiplying circuit shown, should five silicon cells be used, the cost of the circuit would be substantial.

But as the diodes in the alternate stages B and D serve only a blocking function when the input to the system is pulsatory rather than A-C, one may use for these stages, selenium cells which are entirely adequate for this purpose, for the inferior regulating characteristics of selenium do not come into play in the blocking action these cells are called upon to perform.

Consequently, the five-stage tripler uses three fairly expensive rectifying silicon diodes and two low-cost selenium blocking diodes, to effect a significant economy in the over-all cost of the system. It will be appreciated that the invention is not limited to a five-stage multiplier and that a greater number of stages could be used with an even smaller horizontal deflection transformer in a solid-state TV receiver to provide a highly compact low-cost, high-voltage supply which is compatible with the other solid-state circuits in the set.

While there has been shown and described a preferred embodiment of regulated voltage-multiplier system in accordance with the invention, it will be appreciated that many changes and modifications may be made therein without, however, departing from the essential spirit of the invention.

What I claim is:

1. A voltage multiplier system for producing a relatively high direct-voltage, said system comprising:

(A) a low-voltage input source of pulsatory voltage, and (B) a ladder voltage multiplier having intercoupled stages in cascade relation, the first stage being connected to the pulsatory source, each stage being constituted by a capacitor in series with a solid-state diode, the diodes in alternate stages being reversed with respect to the diodes in the other stages to provide a blocking function, the other diodes being rendered conductive during the pulse cycles of the input source to provide a rectifying action causing charging of the associated capacitors, thereby producing a direct output voltage whose value is determined by the peak voltage of the source multiplied by a number equal to the number of rectifying diodes, the blocking diodes being constituted by diode cells having good blocking characteristics and relatively poor regulating characteristics, the rectifying diodes being constituted by diodes having a lower forward resistance and superior regulation characteristics.

2. A system as set forth in claim 1, wherein said blocking diodes are formed by selenium cells.

3. A system as set forth in claim 1, wherein said conducting diodes are formed of silicon cells.

4. A system as set forth in claim 1, wherein said multiplier has five stages to produce a tripling action.

5. A system as set forth in claim 1, wherein said low-voltage source is constituted by the fly-back voltage produced by the horizontal output transformer in a television receiver.

6. A system as set forth in claim 5, wherein said transformer produces a pulsatory voltage having a peak value of about 8000 volts and said multiplier has five stages to triple this value to provide a high voltage for the cathode-ray tube of the receiver.

7. A system as set forth in claim 1, wherein the capacitors progressively decrease in capacitance with distance from the first stage.

8. A system as set forth in claim 1, wherein the current rating of the rectifying diodes progressively decreases in value with distance from the first stage.

References Cited

UNITED STATES PATENTS

| | | | |
|---|---|---|---|
| 2,213,199 | 9/1940 | Bouwers et al. | 321—15 |
| 2,565,621 | 8/1951 | Olson | 321—2 |
| 3,001,101 | 9/1961 | Paddison | 324—119 XR |

FOREIGN PATENTS

| | | |
|---|---|---|
| 520,057 | 12/1955 | Canada. |

J. D. TRAMMEL, Primary Examiner

W. M. SHOOP, Jr., Assistant Examiner

PO-1050
(5/69)

UNITED STATES PATENT OFFICE
CERTIFICATE OF CORRECTION

Patent No. 3,493,840 Dated February 3, 1970

Inventor(s) Harold B. Rosenberg

It is certified that error appears in the above-identified patent and that said Letters Patent are hereby corrected as shown below:

Column 1, line 67, after "multiplier" insert -- system in conjunction with a re- ---- ; delete "formed by alternate blocking".

Column 4, line 29, change "such" to -- much --

SIGNED AND SEALED
JUL 14 1970

(SEAL)
Attest:

Edward M. Fletcher, Jr.
Attesting Officer

WILLIAM E. SCHUYLER, JR.
Commissioner of Patents